Feb. 1, 1955     F. H. CALDWELL     2,700,809
DETACHABLE FASTENING MEANS FOR FISHHOOKS
Filed Oct. 29, 1952
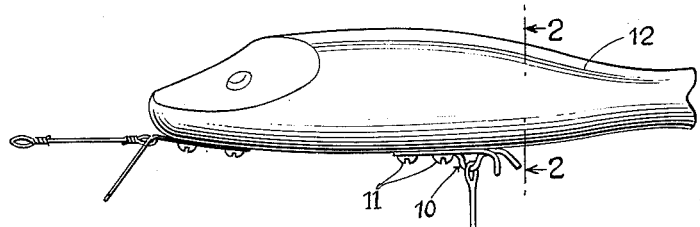
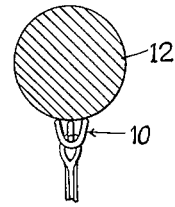
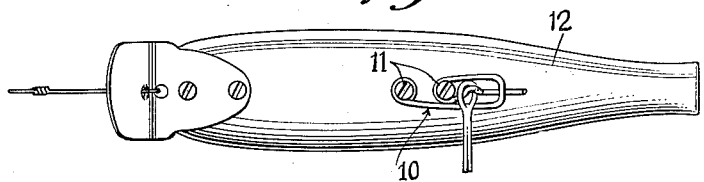
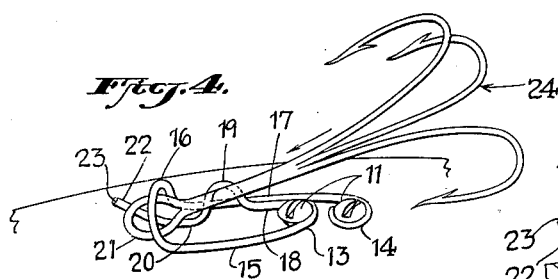
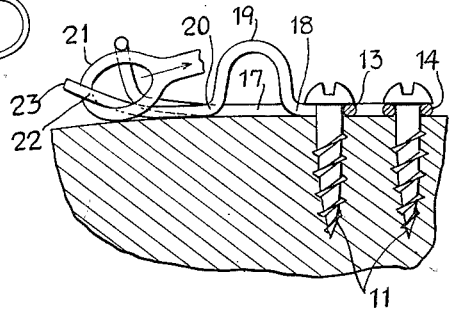
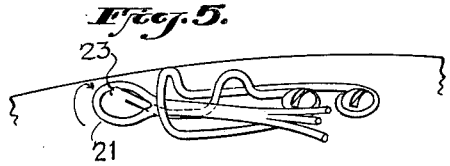
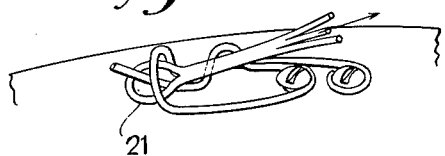
INVENTOR.
FERRIS H. CALDWELL.
BY
Ward, Crosby & Neal
ATTORNEYS.

United States Patent Office 2,700,809
Patented Feb. 1, 1955

2,700,809

DETACHABLE FASTENING MEANS FOR FISHHOOKS

Ferris H. Caldwell, Canton, N. Y.

Application October 29, 1952, Serial No. 317,479

2 Claims. (Cl. 24—237)

This invention relates to devices for detachably but securely attaching fish hooks to other fishing tackle elements such as fishing bobs and the like.

One of the most important requirements of detachable fastening means for fish hooks is, of course, to provide a construction which will secure the hooks with utmost safety against accidental detachment even though the fishing tackle may be forcibly thrashed about or become entangled in various ways. Also, it is important that the construction be durable, inexpensive to manufacture and such that the hooks may easily be attached and removed by the user despite the security with which same are held against accidental detachment.

While a wide variety of constructions for this purpose have been proposed, all of same, so far as I am aware, have for general use been more or less deficient in one respect or another. But with the present invention I have provided a device which has proven exceedingly reliable in preventing detachment of the hooks and yet the device is of such a construction that it may be inexpensively formed of one integral piece of wire so shaped that however the tackle may become entangled, the device is not likely in any way to become inoperative.

Various further and more specific objects, features and advantages of the invention will appear from the description given below taken in connection with the accompanying drawings illustrating, by way of example, the preferred form of the invention.

In the drawings—

Fig. 1 is a side elevational view of a fishing bob with fishing hooks attached thereto by the preferred form of attaching means made in accordance with the invention;

Fig. 2 is a sectional view taken substantially along line 2—2 of Fig. 1;

Fig. 3 is a bottom view of the device of Fig. 1;

Figs. 4, 5 and 6 are enlarged views showing in further detail the manner in which fish hooks may be secured by the attaching means embodying the invention; and Fig. 7 is another view similar to Fig. 6 but showing parts of the attaching device in section and further enlarged.

As shown in Figs. 1 to 3, the attaching device embodying the invention is indicated at 10, secured by a pair of screws as at 11 to the under side of a fishing bob 12, although it will be understood that the device may be used to attach hooks to other forms or parts of fishing tackle, the use of the devices as here shown on the under side of a fishing bob being merely by way of illustration of one of the various possible uses of the invention.

More specifically, and as more clearly shown in Figs. 4 and 7, the attaching device preferably comprises a single integral piece of relatively stiff spring wire formed, for example, of stainless steel and so shaped as to provide eyelet formations at 13, 14 for receiving the attaching screws 11. The eyelet portion 13 is formed at an intermediate point on the piece of wire and the wire extends back therefrom as at 15 along the surface of the bob for a short distance, for example about three-eighths of an inch in a typical case, and then the wire extends with a transverse arched formation 16 over to another longitudinally extending portion which runs forwardly at 17 to the other eyelet portion 14 formed at one end of the piece of wire.

From the eyelet portion 13 a wire portion 18 also extends rearwardly along the surface of the bob for a very short distance to an arch-like formation 19 and thence back to normally rest under pressure against the surface of the bob at 20, in such manner that the arch-like portion 19 forms in effect an eyelet for normally receiving an eyelet as at 21 formed on the hook or hook assembly. From the point 20 the wire extends further to the rear and veers away from the surface of the bob as indicated at 22, the wire ending at point 23 to the rear of and approximately on a line which would form the axis of the arch portion 16.

To connect a hook or assembly of hooks such as indicated at 24, the hook eyelet 21 is first inserted in the arch portion 16 and directed rearwardly along the portion 22, as will be apparent in Fig. 4. Then as the eyelet 21 is thrust rearwardly past the end 23 it may readily be hooked over the end 23 as shown in Fig. 5. Thereupon the hook or hook assembly is drawn forwardly so that the hook eyelet 21 is drawn forwardly about portion 22 (Fig. 6) and then in under the portion 20 so that finally the hook eyelet arrives in engagement with the arch portion 19 as best shown in Fig. 1.

To detach the hook assembly, the hook portions are grasped in one hand while the bob or equivalent is grasped in the other hand, the thumb nail of which may then be pressed against the hook eyelet 21 to force it back in under the portion 20. It will be found that considerable pressure is required to do this, but as soon as the hook eyelet has caused the portion 20 to be elevated from the surface of the bob, then the hook eyelet may be directed rearwardly and easily detached by following motions in reverse of those followed in attaching the hook. But before it is possible to actually start the detaching operation, it will be found that it is necessary to bring the hook shank into a position about normal to the surface of the bob and to thrust the shank portion of the hook rearwardly with enough force to separate the portion 20 from the surface of the bob. But merely to do this will not cause detachment of the hook because the hook eyelet will engage the arch potrion 16, and in order to have the hook eyelet pass into portion 16 it is then necessary to tilt the hook shank forwardly and at the same time thrust it rearwardly. Even then the hook eyelet will not tend to become unhooked from the wire end 23 until the hook shank is turned about its axis and drawn forwardly again to pull the eyelet out from beneath the arch portion 16. Thus the detachment of the hook involves bringing the hook shank successively into a series of different positions while manipulating it in a plurality of ways different from the ways in which the hook would ordinarily be moved in normal use of the fishing tackle and the combination of manipulations required for detaching the hook is such that the possibilities of accidental detachment become quite negligible.

It will further be noted that the arched portion 16 while serving the function of requiring a particular combination of manipulations before the hook can be detached, also serves the further important function that it protects the wire end portions 22, 23 against being caught by any object and bent out of proper position, while at the same time leaving the portion 22 free to yield transversely through a limited distance as occasion may require in applying or disconnecting the hook or at other times. For example, if a powerful pulling force is applied to the hook in use, sufficient to tend to pull the portion 20 away from the surface of the bob, such displacement will be limited by the engagement of the portion 22 with the arched portion 16, and yet the hook eyelet cannot be released by such force on the hook as applied in any normal way because the position of the shank of the hook has to be changed a plurality of times before the hook eyelet can be released.

Although one particular embodiment of the invention is here disclosed for purposes of explanation, various modifications thereof, after study of this specification, may be apparent to those skilled in the art to which the invention pertains. Reference should accordingly be had to the appended claims in determining the scope of the invention.

What is claimed and desired to be secured by Letters Patent, is:

1. Means for detachably retaining fish hooks on a fishing bob, comprising a single integral piece of spring wire having two spaced portions adapted to be detachably attached to a bob, a portion extending from one of said attaching portions toward and past the other attaching portion and provided with an upstanding arch formation and a return section from the arch formation to the second attaching portion, and another portion extending from the second attaching portion toward and through said arch formation and having a hump between the second attaching portion and said arch formation and a free end beyond the arch formation for initially receiving the eye of a hook.

2. Means for detachably retaining fish hooks on a fishing bob comprising a single integral piece of spring wire having two portions adapted to be detachably attached to a bob, a portion extending from one of said attaching portions and provided with an upstanding arch formation and a section extending from such arch formation to the second attaching portion, and another portion extending from one of said attaching portions toward and through said arch formation and having a hump between the last specified attaching portion and said arch formation and a free end beyond the arch formation for initially receiving the eye of a hook, said hump, arch formation and free end being shaped and positioned whereby the eye of the hook may be first inserted through said arch formation and to a position surrounding said free end and then drawn back through the arch formation to a position where the eye surrounds said hump.

References Cited in the file of this patent

UNITED STATES PATENTS

| | | |
|---|---|---|
| 1,299,864 | Severs | Apr. 8, 1919 |
| 1,424,385 | Stolley | Aug. 1, 1922 |
| 2,437,549 | Pecher | Mar. 9, 1948 |